US007744263B2

(12) United States Patent
Bottomley

(10) Patent No.: US 7,744,263 B2
(45) Date of Patent: Jun. 29, 2010

(54) STRUCTURED OPTICAL FILM

(75) Inventor: David John Bottomley, Swindon (GB)

(73) Assignee: Microsharp Corporation Limited, Watchfield, Swindon, Oxfordshire (GB)

( * ) Notice: Subject to any disclaimer, the term of this patent is extended or adjusted under 35 U.S.C. 154(b) by 429 days.

(21) Appl. No.: 11/721,410

(22) PCT Filed: Dec. 16, 2005

(86) PCT No.: PCT/GB2005/004874

§ 371 (c)(1),
(2), (4) Date: Jun. 11, 2007

(87) PCT Pub. No.: WO2006/064259

PCT Pub. Date: Jun. 22, 2006

(65) Prior Publication Data

US 2009/0279280 A1    Nov. 12, 2009

(30) Foreign Application Priority Data

Dec. 16, 2004  (GB)  ............................ 0427607.7

(51) Int. Cl.
*F21V 7/04* (2006.01)
(52) U.S. Cl. ................... 362/618; 362/620; 362/627
(58) Field of Classification Search ............ 362/618, 362/620, 627, 341, 331, 332; 359/831, 621, 359/837, 834; 428/172, 156; 349/57
See application file for complete search history.

(56) References Cited

U.S. PATENT DOCUMENTS

| 4,260,220 A | 4/1981 | Whitehead |
| 4,542,449 A | 9/1985 | Whitehead |
| 4,791,540 A | 12/1988 | Dreyer, Jr. et al. |
| 4,799,131 A | 1/1989 | Aho et al. |
| 4,874,228 A | 10/1989 | Aho et al. |

(Continued)

FOREIGN PATENT DOCUMENTS

GB   2 340 280 A   2/2000

(Continued)

OTHER PUBLICATIONS

Hecht and Zajac, *Optics*, Published by Addison-Wesley, London, UK, pp. 10, 15, 258, 472, 494, and 559, 1974.

(Continued)

*Primary Examiner*—Ali Alavi
(74) *Attorney, Agent, or Firm*—Workman Nydegger

(57) ABSTRACT

Disclosed are structured optical films and optical displays incorporating such films. The film has a structured surface including a plurality of substantially parallel and elongate light-directing elements. Each element has a respective peak and defining at a junction with an adjacent element a respective valley. Each of the peaks and valleys define substantially the same dihedral angle and extend substantially uninterrupted across the structured surface. A first sequence defined by successive lateral distances between adjacent peaks is a first non-periodic sequence. A second sequence defined by successive lateral distances between adjacent valleys is a second non-periodic sequence. The second sequence is configured based on the first sequence, such that the peaks are arranged in a substantially coplanar formation. Alternatively, the first sequence is configured based on the second sequence, such that the valleys are arranged in a substantially coplanar formation.

26 Claims, 9 Drawing Sheets

U.S. PATENT DOCUMENTS

| | | | |
|---|---|---|---|
| 4,883,341 | A | 11/1989 | Whitehead |
| 4,906,070 | A | 3/1990 | Cobb, Jr. |
| 4,984,144 | A | 1/1991 | Cobb, Jr. et al. |
| 5,056,892 | A | 10/1991 | Cobb, Jr. |
| 5,161,041 | A | 11/1992 | Abileah et al. |
| 5,175,030 | A | 12/1992 | Lu et al. |
| 5,183,597 | A | 2/1993 | Lu |
| 5,195,818 | A | 3/1993 | Simmons et al. |
| 5,224,770 | A | 7/1993 | Simmons et al. |
| 5,237,641 | A | 8/1993 | Jacobson et al. |
| 5,262,880 | A | 11/1993 | Abileah |
| 5,303,322 | A | 4/1994 | Winston et al. |
| 5,339,382 | A | 8/1994 | Whitehead |
| 5,471,348 | A * | 11/1995 | Miller et al. ................. 359/837 |
| 5,528,720 | A | 6/1996 | Winston et al. |
| 5,552,907 | A | 9/1996 | Yokota et al. |
| 5,594,830 | A | 1/1997 | Winston et al. |
| 5,598,280 | A | 1/1997 | Nishio et al. |
| 5,626,800 | A | 5/1997 | Williams et al. |
| 5,704,703 | A | 1/1998 | Yamada et al. |
| 5,771,328 | A * | 6/1998 | Wortman et al. ............ 385/146 |
| 5,779,337 | A | 7/1998 | Saito et al. |
| 5,780,140 | A | 7/1998 | Nilsen |
| 5,828,488 | A | 10/1998 | Ouderkirk et al. |
| 5,851,062 | A | 12/1998 | Shinohara et al. |
| 5,858,139 | A | 1/1999 | Ouderkirk et al. |
| 5,908,874 | A | 6/1999 | Fong et al. |
| 5,917,664 | A | 6/1999 | O'Neill et al. |
| 5,919,551 | A * | 7/1999 | Cobb et al. ................. 428/156 |
| 6,002,829 | A | 12/1999 | Winston et al. |
| 6,025,897 | A | 2/2000 | Weber et al. |
| 6,044,196 | A | 3/2000 | Winston et al. |
| 6,052,164 | A | 4/2000 | Cobb, Jr. et al. |
| 6,091,547 | A | 7/2000 | Gardiner et al. |
| 6,111,696 | A | 8/2000 | Allen et al. |
| 6,277,471 | B1 | 8/2001 | Tang |
| 6,280,063 | B1 | 8/2001 | Fong et al. |
| 6,322,236 | B1 | 11/2001 | Campbell et al. |
| 6,335,999 | B1 | 1/2002 | Winston et al. |
| 6,354,709 | B1 | 3/2002 | Campbell et al. |
| 6,356,389 | B1 | 3/2002 | Nilsen et al. |
| 6,478,438 | B1 | 11/2002 | Ishikawa et al. |
| 6,543,153 | B1 | 4/2003 | Weber et al. |
| 6,560,026 | B2 | 5/2003 | Gardiner et al. |
| 6,570,710 | B1 | 5/2003 | Nilsen et al. |
| 6,581,286 | B2 | 6/2003 | Campbell et al. |
| 6,671,452 | B2 | 12/2003 | Winston et al. |
| 6,707,611 | B2 | 3/2004 | Gardiner et al. |
| 6,726,332 | B2 | 4/2004 | Cannon et al. |
| 6,759,113 | B1 | 7/2004 | Tang |
| 6,811,274 | B2 | 11/2004 | Olczak |
| 6,844,417 | B1 | 1/2005 | Chisholm et al. |
| 6,845,212 | B2 | 1/2005 | Gardiner et al. |
| 6,862,141 | B2 | 3/2005 | Olczak |
| 6,972,813 | B1 | 12/2005 | Toyooka |
| 6,997,595 | B2 | 2/2006 | Mi et al. |
| 7,180,690 | B2 * | 2/2007 | Nagao ........................ 359/837 |
| 2001/0008464 | A1 | 7/2001 | Ouderkirk et al. |
| 2002/0012248 | A1 | 1/2002 | Campbell et al. |
| 2002/0051866 | A1 | 5/2002 | Mullen |
| 2002/0094417 | A1 | 7/2002 | Phillips |
| 2002/0141194 | A1 | 10/2002 | Wortman et al. |
| 2003/0100693 | A1 | 5/2003 | Olson et al. |
| 2003/0133301 | A1 | 7/2003 | Mullen |
| 2003/0164914 | A1 | 9/2003 | Weber et al. |
| 2004/0027676 | A1 | 2/2004 | Nilsen et al. |
| 2004/0043234 | A1 | 3/2004 | Hay et al. |
| 2004/0062028 | A1 | 4/2004 | Winston et al. |
| 2004/0105154 | A1 | 6/2004 | Luong et al. |
| 2004/0120136 | A1 | 6/2004 | Olczak et al. |
| 2004/0136172 | A1 | 7/2004 | Boyd et al. |
| 2004/0169928 | A1 | 9/2004 | Nilsen et al. |
| 2004/0175528 | A1 | 9/2004 | Paulson et al. |
| 2004/0190102 | A1 | 9/2004 | Mullen et al. |
| 2004/0228106 | A1 | 11/2004 | Stevenson et al. |
| 2004/0246599 | A1 | 12/2004 | Nilsen |
| 2005/0001043 | A1 | 1/2005 | Gardiner et al. |
| 2005/0002098 | A1 | 1/2005 | Allen et al. |
| 2005/0024726 | A1 | 2/2005 | Ouderkirk et al. |
| 2005/0024754 | A1 | 2/2005 | Epstein et al. |
| 2005/0069678 | A1 | 3/2005 | Olczak et al. |
| 2005/0134963 | A1 | 6/2005 | Stevenson et al. |
| 2005/0141110 | A1 | 6/2005 | Olczak |
| 2005/0141243 | A1 | 6/2005 | Mullen et al. |
| 2005/0141844 | A1 | 6/2005 | Olczak |
| 2005/0185416 | A1 | 8/2005 | Lee et al. |
| 2005/0225865 | A1 | 10/2005 | Olczak |
| 2005/0232572 | A1 | 10/2005 | Winston et al. |
| 2005/0237749 | A1 | 10/2005 | Epstein et al. |
| 2005/0270439 | A1 | 12/2005 | Weber et al. |
| 2005/0270798 | A1 | 12/2005 | Lee et al. |
| 2005/0275945 | A1 | 12/2005 | Brickey et al. |
| 2005/0276949 | A1 | 12/2005 | Bourdelais et al. |
| 2006/0018026 | A1 | 1/2006 | Bastawros et al. |

FOREIGN PATENT DOCUMENTS

| | | |
|---|---|---|
| JP | 6082635 | 3/1994 |
| WO | WO 97/28468 | 8/1997 |
| WO | WO 97/39369 | 10/1997 |
| WO | WO 01/27663 A1 | 4/2001 |
| WO | WO 02/23258 A2 | 3/2002 |

OTHER PUBLICATIONS

Isaac Amidror, *The Theory of the Moiré Phenomenon*, Kluwer Academic Publishers, Dordrecht, The Netherlands, 2000.

* cited by examiner

STRUCTURED OPTICAL FILM

BACKGROUND OF THE INVENTION

1. Field of the Invention

The present invention relates to the field of structured optical films and optical displays incorporating the structured optical films.

2. Discussion of Related Art

Structured optical films are used in optical display systems and in other applications where control over the direction of light, transmitted and/or reflected, is desired to increase brightness, reduce glare, etc. Structured optical films are described in U.S. Pat. No. 4,906,070 (Cobb). Essentially, they comprise films of light transmissible materials on which a series of prisms is disposed such that the films can be used to redirect light through reflection and refraction. When used in an optical display such as that found in laptop computers, watches, etc., the structured optical film can increase the brightness of the optical display by limiting light escaping from the display to within a desired viewing range, for example defined by a pair of planes disposed at desired angles from a normal axis running through the optical display. As a result, light that would otherwise exit the display outside of the allowable range is reflected back into the display where a portion of it can be "recycled" and returned back to the structured film at an angle that allows it to escape from the display. Such recycling is useful because it can reduce the power consumption needed to provide a display with a desired level of brightness.

FIGS. 1 and 2 generally illustrate the concept of structured optical films. FIG. 1 depicts a section of a regular, simple repeating pattern structured optical film 10 including a structured surface 12 and a planar surface 14. The structured surface includes a series of regularly spaced valleys 16 and peaks 18 that define prisms 20. The prisms 20 are defined by facets formed between the valleys 16 and peaks 18. The geometry of the structured surface 12 and the material used to manufacture the film 10 foster total internal reflection and refraction of light entering the planar side 14 of film 10 to minimize the escape of light through the structured surface outside of the desired range of angles.

Some optical displays incorporate a second structured optical film in which the prisms are oriented at an angle with respect to the prisms in the first optical film. That angle can be anywhere from greater than zero to 90°, although it is typically about 90°. FIG. 2 illustrates a pair of structured optical films 22 and 24 in which the prisms 26 and 28, respectively, are oriented at approximately a 90° angle with respect to each other. In use, it is preferred that the structured surface 28 be in contact with, or nearly in contact with, the planar surface 27 of the upper film 22.

An undesirable effect of using a structured optical film in an optical display is the appearance of reflected moiré effects caused by the interference of two superimposed repeating patterns. Moiré effects are discussed in "The Theory of the Moiré Phenomenon", by Isaac Amidror, Kluwer Academic Publishers, Dordrecht, The Netherlands (2000). In an optical display incorporating a single layer of structured optical film, the repeating patterns causing moiré effects are the pattern in the film itself and the reflected image of the film pattern, as reflected by other surfaces in the optical display.

Although using two structured optical films can increase the brightness of the display within a narrowed viewing range, this can also increase the appearance of moiré effects by providing a second planar surface, on the lower structured film, that reflects more light back through the repeating pattern in the first, or upper, structured film.

Addressing moiré effects in brightness enhancement films, U.S. Pat. No. 5,919,551 (Cobb) describes the use of structured optical films in which the pitch of the peaks and/or valleys is different for successive groups of peaks and/or valleys. However, while such films apparently reduce the visibility of moiré effects, the brightness of an LCD display employing such films may be reduced by approximately 6% or more relative to LCD displays which use films as shown in prior art FIG. 2.

FIG. 3A schematically depicts a cross-section, normal to the planar surface 32, of one such structured optical film 30. The film 30 includes a set of prisms defined by peaks 36 and valleys 38. The peaks 36 and valleys 38 defining the prisms are substantially parallel to each other. The spacing between adjacent peaks 36, i.e., the peak pitch, of the optical film 30 is substantially constant. The spacing between adjacent valleys 38, however, varies over any group of three successive valleys 38. That spacing between valleys 38 can also be referred to as valley pitch, Pv. By varying the valley pitch, the visibility of moiré interference patterns may apparently be reduced when using film 30 in an optical display.

In the film 30 depicted in FIG. 3A, peak pitch is held constant while the valley pitch varies. The tooling used to manufacture the film 30 can, however, be replicated by electroforming or other suitable processes, thus forming a "negative" of the pattern formed on the master tool. When that replicated tool is then used to form a film, the result, depicted in FIG. 3B from the prior art, is a film 130 that is a "negative" of the film 30 depicted in FIG. 3A. As a result, film 130 has a constant valley pitch, Pv, between valleys 136 while the peak pitch, Pp, between peaks 138 varies across the film 130. That is exactly the opposite of the pitch characteristics of the film 30. Like film 30, the film 130 in FIG. 3B may also apparently be used for reducing the visibility of moiré interference patterns when used in an optical display.

However, even with the 'grouped' structures described above, it should be understood that moiré interference effects will be observable under certain circumstances. The reason is that the structural arrangement of the film described above still retains the capacity to produce moiré interference effects.

In addition, the use of a second structured optical film may also lead to optical coupling between the two films. This can result in uneven light transmission from the display, i.e., visible bright spots, streaks, and/or lines in the display. Optical coupling is caused by contact, or very near contact, between the structured surface of a structured optical film and a planar surface disposed above the film.

U.S. Pat. No. 5,771,328 (Wortman) describes the use of structured optical films with a variable height in order to reduce the influence of optical defects such as bright spots, streaks and lines in display applications. FIGS. 4-6 illustrate representative prior art constructions for such a light directing film. It should be noted that these drawings are not to scale and that, in particular, the size of the surface is greatly exaggerated for illustrative purposes.

However, it should be understood that the films disclosed in U.S. Pat. No. 5,771,328 still suffer from the moiré interference effects described above, due to their structural arrangement.

Films in which the valley dihedral angles vary from valley to valley are known from WO1997/28468. Films in which the peak and valley dihedral angles vary from peak to peak and from valley to valley are known from WO2002/23258 and WO2001/27663. However, such variation in prism angle and orientation is undesirable, since may reduce the uniformity and controllability of light redirection in the films.

A linear prismatic surface comprising peaks with an irregular spacing is disclosed in JP06-082635. However, the structure of the surface is complex, and not easy to manufacture.

SUMMARY OF THE INVENTION

According to one aspect of the invention, there is provided a structured optical film having at least one structured surface, said structured surface comprising a plurality of substantially parallel and elongate light-directing elements, each element having a respective peak and defining at a junction with an adjacent element a respective valley, each peak and each valley defining substantially the same dihedral angle and extending substantially uninterrupted across the structured surface, wherein both a first sequence defined by successive lateral distances between adjacent peaks and a second sequence defined by successive lateral distances between adjacent valleys are respective non-periodic sequences, wherein the peaks are substantially coplanar, characterized in that given the first non-periodic sequence the second sequence is the unique non-periodic sequence which enables the peaks to have the property of being substantially coplanar.

According to another aspect of the invention, there is provided a structured optical film having at least one structured surface, said structured surface comprising a plurality of substantially parallel and elongate light-directing elements, each element having a respective peak and defining at a junction with an adjacent element a respective valley, each peak and each valley defining substantially the same dihedral angle and extending substantially uninterrupted across the structured surface, wherein both a first sequence defined by successive lateral distances between adjacent valleys and a second sequence defined by successive lateral distances between adjacent peaks are respective non-periodic sequences, wherein the valleys are substantially coplanar, characterized in that given the first non-periodic sequence the second sequence is the unique non-periodic sequence which enables the valleys to have the property of being substantially coplanar.

The present invention provides a structured optical film in which both the sequence of distances between adjacent peaks and the sequence of distances between adjacent grooves of the structure are respectively non-periodic. Such a film may reduce the visibility of moiré interference patterns in optical displays incorporating one or more layers of the film.

In one embodiment, the present invention includes a structured optical film having a structured surface that includes a plurality of generally parallel peaks, each pair of adjacent peaks being separated by a valley. Across the film in a direction substantially perpendicular to the peaks, a first sequence from the lateral distances between the adjacent peaks may be formed; similarly, a second sequence may be formed from the lateral distances between the adjacent valleys. In this embodiment, both of the two sequences of numbers are respectively non-periodic, in order to aid in the reduction of the scope for moiré interference effects.

Advantageously, a respective dihedral angle formed at each peak and a respective dihedral angle formed at each valley is the same angle.

According to a further aspect of the invention, there is provided a structured optical film comprising a first surface and a structured surface opposite said first surface, wherein the structured surface comprises a plurality of generally parallel peaks, each peak having a length and the length of each peak extending substantially uninterrupted across the structured surface, each pair of peaks being separated by a valley, wherein each of the plurality of peaks has a dihedral angle, the sequence of lateral distances between adjacent peaks forming a first non-periodic sequence and the sequence of lateral distances between adjacent valleys forming a second non-periodic sequence, with the peak apexes being substantially coplanar in order to augment the optical brightness produced when the film is used in a LCD display.

According to a further aspect of the invention, there is provided an optical display assembly comprising: a display panel; a backlight assembly; a first structured optical film located between the backlight assembly and the display panel, the film having a structured optical surface comprising a plurality of prisms, each of the prisms comprising a peak having a length, a pair of adjacent valleys, and a dihedral angle defined by the facets extending from the peak to the pair of adjacent valleys defining the prisms, wherein each of the prisms extends substantially uninterrupted across the structured surface along the length of its peak and the dihedral angles of each of the prisms in the plurality of prisms and of each of the valleys are the same, and further wherein each pair of adjacent prisms is immediately adjacent each other, the sequence of lateral distances between adjacent prism peaks forming a non-periodic sequence and the sequence of lateral distances between adjacent prism valleys forming a non-periodic sequence, wherein either the peaks or the valleys are substantially coplanar.

According to another aspect of the invention, there is provided an optical display assembly comprising a display panel; a backlight assembly; and a structured optical film in accordance with the invention, the film being located between the backlight assembly and the display panel.

According to another aspect of the invention, there is provided an optical display assembly comprising a display panel; a light source; and a structured optical film in accordance with the invention, the film being located between the light source and the display panel.

According to another aspect of the invention, there is provided a master tool production system arranged to produce a master tool, the master tool being configured- to manufacture the structured optical film according to the present invention.

The above and other features of the invention are more fully shown and described in the drawings and detailed description of this invention, where like reference numerals are used to represent similar parts. It is to be understood, however, that the description and drawings, which are not necessarily to scale, are for the purposes of illustration only and should not be read in a manner that would unduly limit the scope of this invention.

DETAILED DESCRIPTION OF THE INVENTION

The present invention, described in connection with the illustrative embodiments depicted in FIGS. 7-8 and the other figures, provides a structured optical film in which both of the sequences of lateral distances between adjacent valleys and of lateral distances between adjacent peaks are sequences without periodicity. The resulting effect can be to reduce the visibility of the moiré interference patterns which may be observed when using one or more layers of the structured films in, for example, an optical display.

Although the prisms/facets generally depicted in connection with the present invention are shown as having a dihedral angle of about 90° between generally planar facets, it will be understood that the present invention includes structured optical films having prisms/facets formed in any optically useful shape, including lenticular arrays, prisms with rounded peaks and/or valleys, curved facets, asymmetric prisms etc. In other words, the present invention is useful with any structured optical film which in the absence of the use of this invention would display a repeating pattern that could result in more apparent moiré interference patterns in the absence of the non-periodic sets of distances between adjacent peaks and adjacent valleys as described herein. Furthermore, although the embodiments discussed below include a planar surface, it will be understood that the opposing surface of the structured optical films manufactured according to the present invention, i.e., the surface opposite the structured surface, could be substantially planar or it could be provided with a structure, texture, as a smooth surface, or with any other finish as desired.

Figure 7:
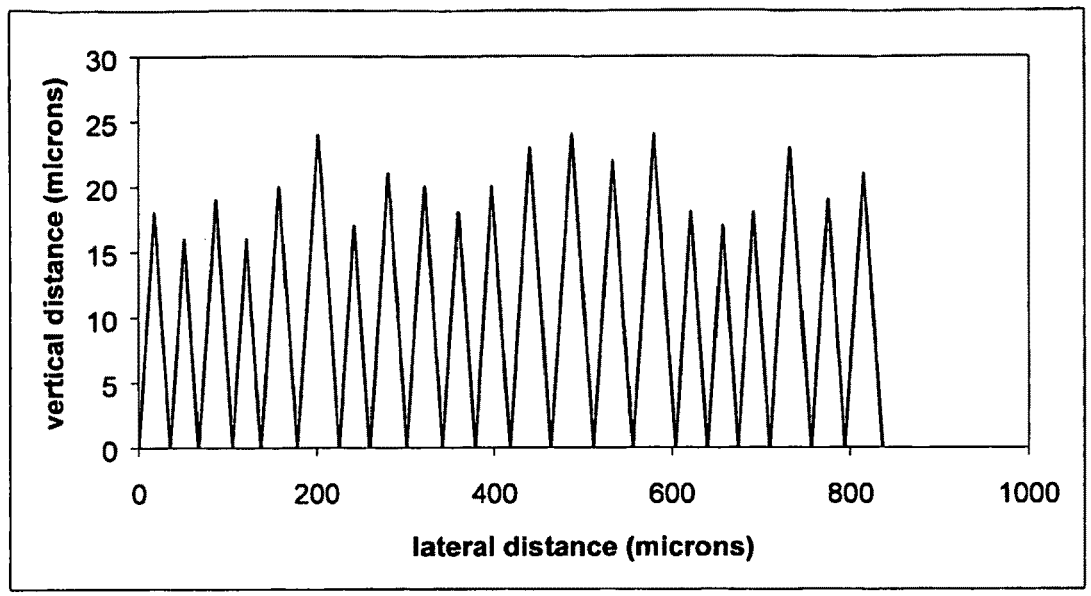
FIG. 7 is a plot of a film profile of an illustrative example of the first embodiment of the invention.
Figure 8:
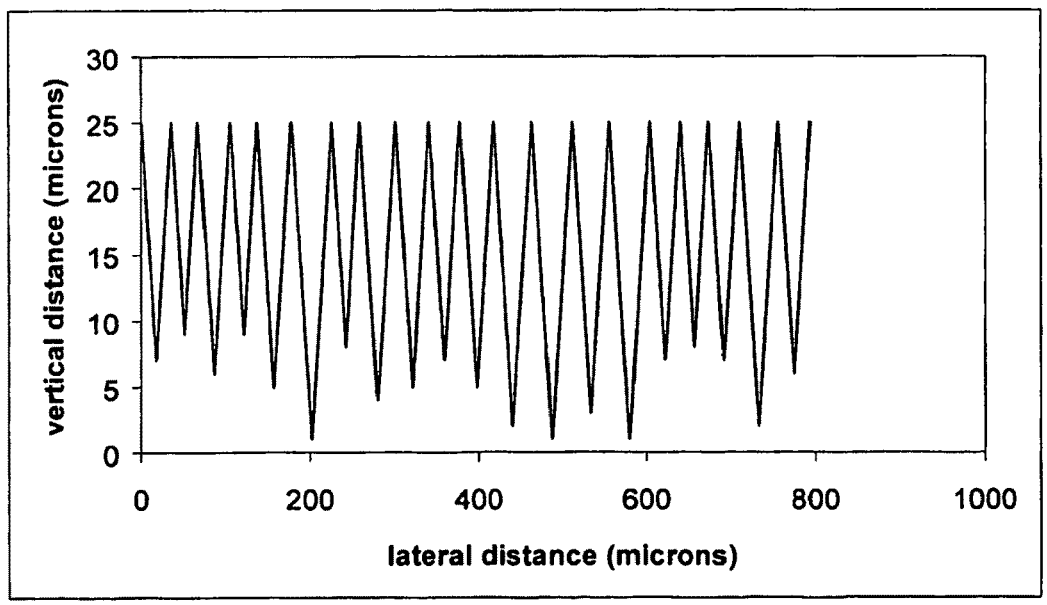
FIG. 8 is a plot of a film profile of an illustrative example of the second embodiment of the invention.

It should also be understood that the embodiments of the invention depicted in FIGS. 7-8 and following are generally planar cross-sections of structured optical films constructed according to the present invention taken generally perpendicular to the length of the grooves/valleys. Given the variable nature of the optical films according to the present invention to reduce the visibility of moiré interference patterns, it will be understood that the cross-sections of a given film may or may not remain constant along the length of the grooves/valleys. This may be particularly true in the structured optical films manufactured according to the present invention using tooling constructed by thread cutting a cylindrical roll.

In a first embodiment of the present invention, a structured optical film is constructed for which both a first sequence of lateral distances between adjacent peaks and a second sequence of lateral distances between adjacent valleys are respective non-periodic sequences of numbers. The first sequence may be specifically chosen according to set criteria for producing a non-periodic sequence, or it may be partly or entirely random. For example, such a sequence can be derived from random number generators or from pseudo-random number generators. One method of constructing a sequence of random numbers is to employ the digits of the number $\pi$, although many variants of this method will be obvious to persons skilled in the art.

One method of constructing the dimensions of the non-periodic array of structures for the film surface is given here, although many variants will be obvious to persons skilled in the art. In the method given here, the bases of the prisms all lie in the same plane, but in the general case the prism bases need not be coplanar; likewise, in the general case the prism apexes need not be coplanar. The method given here is to construct symmetric prisms with a 90° apex angle, where the width of the base of the nth prism in $\mu m$ is 30 plus two times the nth digit of $\pi$. Here throughout we use numbers expressed with respect to base ten, but any other base may be used to the same effect. Thus, taking the 21 most significant figures of $\pi$:

$$\pi = 3.14159\ 26535\ 89793\ 23846,$$

the first 21 prism widths on the film will be, in $\mu m$ and in sequence:

36, 32, 38, 32, 40, 48, 34, 42, 40, 36, 40, 46, 48, 44, 48, 36, 34, 36, 46, 38, 42.

This sequence defines the distances between adjacent valleys and is a non-periodic sequence.

In this embodiment, the sequence of distances between adjacent peaks in this structure is given by half the sum of an adjacent pair of valley distances. The sequence of lateral distances between adjacent peaks in this structure has the unique property that, given the sequence of prism widths, it is this unique non-periodic sequence of numbers which permits the valleys of the film to be coplanar and all dihedral angles of the peaks and valleys to be equal: no other sequence of numbers has this property. Thus in the above structure the sequence of the first 20 lateral adjacent peak distances will be, in $\mu m$ and in sequence:

34, 36, 35, 36, 44, 41, 38, 41, 38, 38, 43, 47, 46, 46, 42, 35, 35, 41, 42, 40.

The first 21 prisms in this structure are plotted in cross-section in FIG. 7. In FIG. 7, the valleys are coplanar whereas the peaks are not coplanar.

Because in this embodiment the apex angle, also known as the dihedral angle, formed between the longitudinal facets of each prism is set at 90°, the height of each prism, labelled "vertical distance" in FIG. 7, varies across the film, in accordance with the valley-to-valley distance for that prism.

In this embodiment, because the valleys are coplanar, it is possible to keep to a low level the volume of material required to make the film and thereby keep manufacturing costs low, as there is a constant distance across the film between the valley bottoms and the plane which defines the opposite side of the film. It will be appreciated that, if the valley bottoms were not coplanar, then for some defined minimum distance between the valley bottoms and the plane which defines the opposite side of the film, there would be valley bottoms which would be further away from the plane which defines the opposite side of the film than the said minimum distance, which would increase the volume of material required to manufacture the film, and hence increase manufacturing cost.

In a second and preferred embodiment of the present invention, a structured optical film is constructed for which both the sequences of lateral distances between adjacent peaks and of lateral distances between adjacent valleys are non-periodic sequences of numbers, but for which the peak apexes all lie in the same plane. A specific example is given next, but other methods of constructing such structured optical surfaces will be obvious to those skilled in the art. The method given here is to construct symmetric prisms with a 90° dihedral angle, where the separation of the apexes of the nth prism and the (n+1)th prism in μm is 30 plus two times the nth digit of π. The sequence of the first 21 prism apex separations on the film will be in μm and in sequence:

36, 32, 38, 32, 40, 48, 34, 42, 40, 36, 40, 46, 48, 44, 48, 36, 34, 36, 46, 38, 42.

This sequence defines the lateral distances between adjacent apexes and is a non-periodic sequence. The sequence of lateral distances between adjacent valleys in this structure is given by half the sum of an adjacent pair of apex separations. The sequence of lateral distances between adjacent valleys in this structure has the unique property that, given the sequence of prism apex separations, it is this unique non-periodic sequence of numbers which permits the peaks of the film to be coplanar and all dihedral angles of the peaks and valleys to be equal: no other sequence of numbers has this property. Thus in the above structure the sequence of the first 20 lateral adjacent valley separations in μm and in sequence is:

34, 36, 35, 36, 44, 41, 38, 41, 38, 38, 43, 47, 46, 46, 42, 35, 35, 41, 42, 40.

The first 20 prisms in this structure are plotted in cross-section in FIG. 8. In FIG. 8, the peaks are coplanar whereas the valleys are not coplanar.

In order to prepare a film about 1 meter wide using prisms with an average width of about 40 μm, using the geometrical construction methods described above, it would be necessary to know π to about 25,000 significant figures. An expression of π to this level of precision can be generated using commercially available software, e.g. Mathematica, by Wolfram Research, Inc. of Illinois, USA. It should be emphasized that the film prepared using π to about 25,000 significant figures would contain no repeating pattern of prisms whatsoever.

Before cutting the tooling with which to manufacture the film, a computer file is preferably generated, containing the sequence of peak geometries, such as the individual peak heights and the separation between given pairs Of peaks, required in the film for the very large number of peaks required e.g. about 25,000. The computer file is preferably read by the machine which is used to cut the master tool, as the tool is cut, to ensure that the required sequence of valley geometries is generated on the master tool. It will be appreciated that because a peak in the film corresponds to a valley on the master tool, it is the valley geometries of the master tool which must be controlled in order to generate the required sequence of peak geometries in the film.

Figure 9:
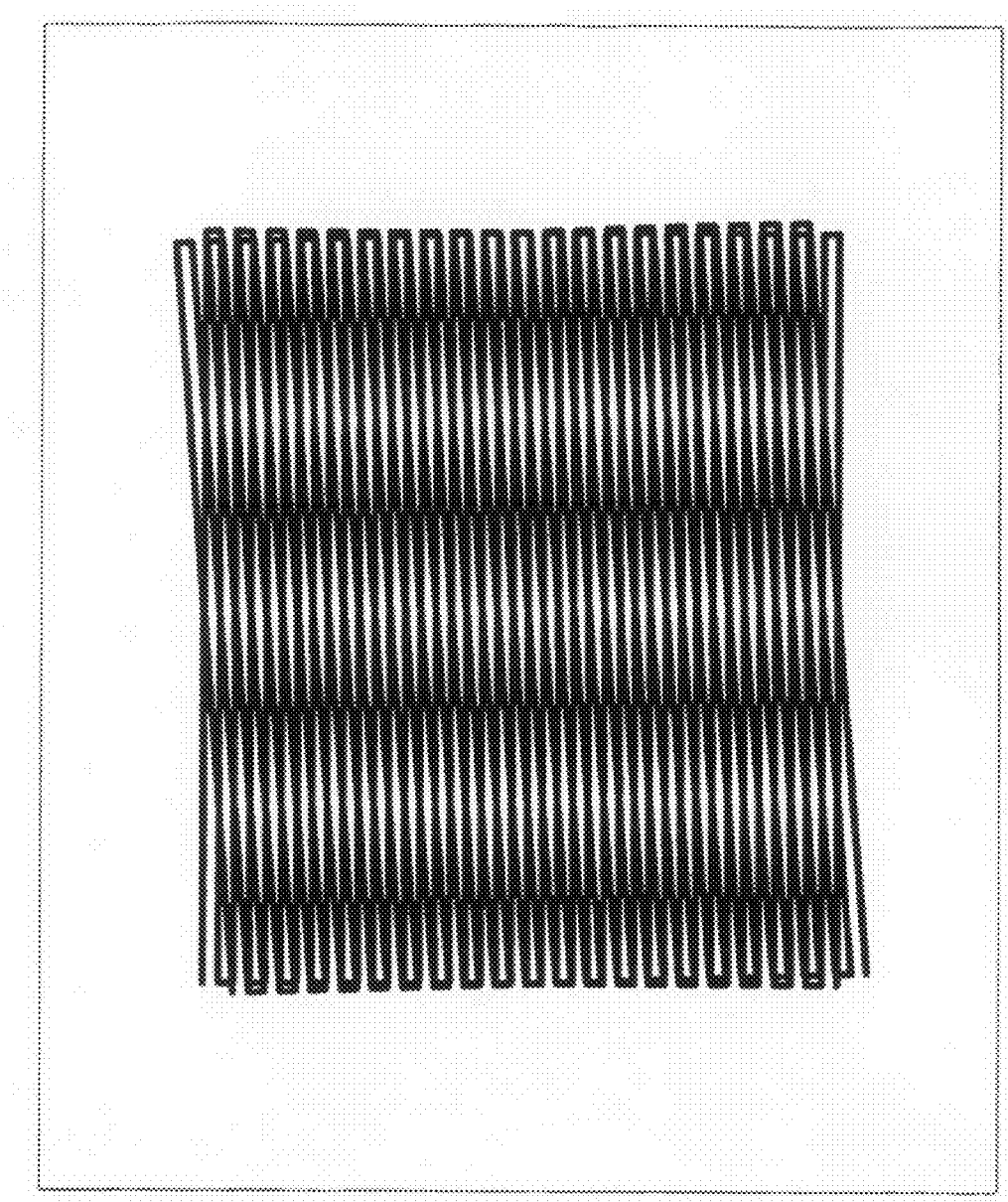
FIG. 9 is a plot of the composite pattern resulting from superimposing the same repeating pattern of lines, where one set of lines is rotated with respect to the other set of lines.
Figure 10:
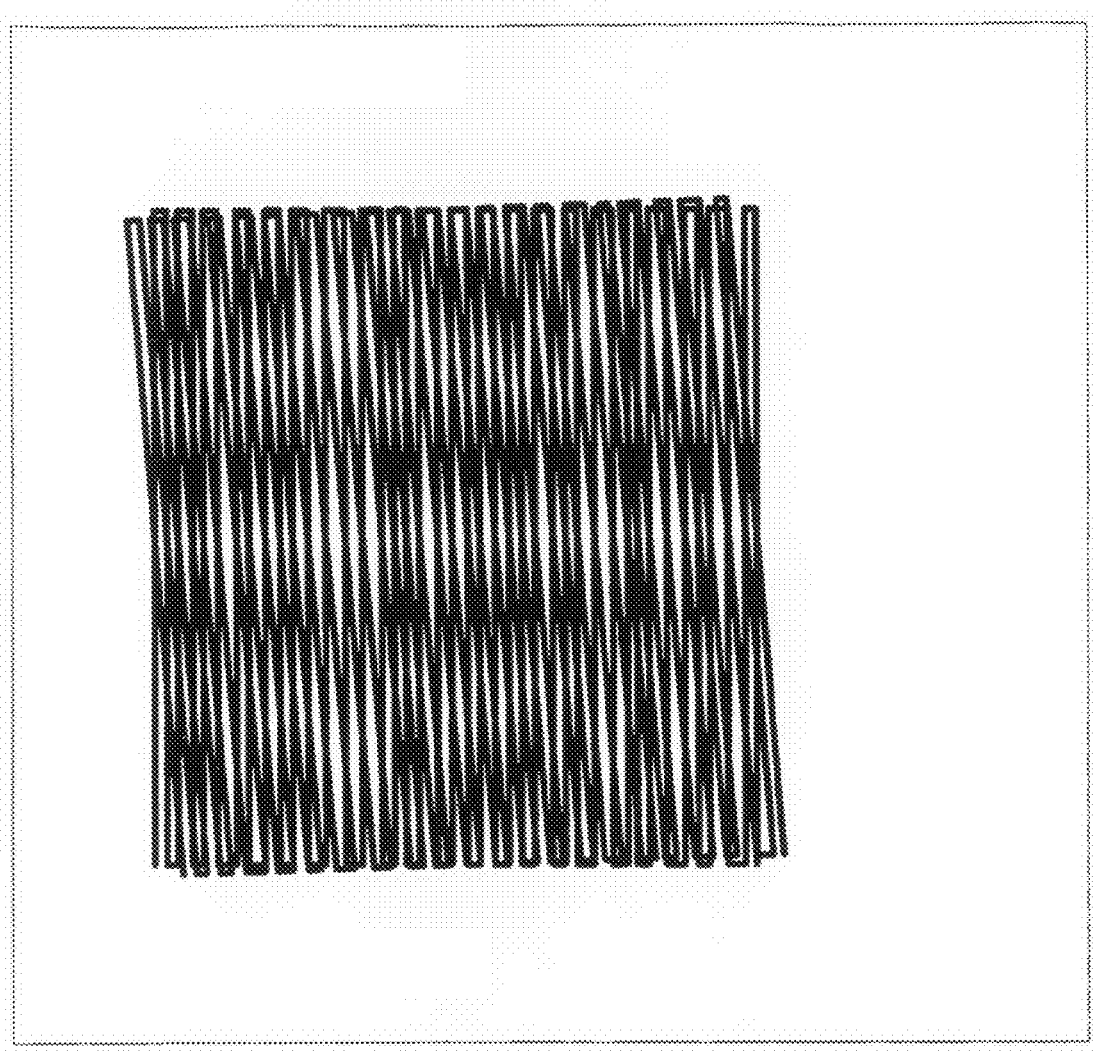
FIG. 10 is a plot of a what is seen when a set of non-periodic lines is superimposed upon itself, where one set of lines is rotated with respect to the other set of lines.

An illustration of the reduced scope for moiré interference effects afforded by a film of the invention is given in FIGS. 9-10. In FIG. 9, the pattern shown results from a repeating line pattern which has been superimposed with the identical line pattern rotated by 3°. Linear moiré features, which are bright or dark relative to each other, are visible across the composite pattern. In FIG. 10, what is shown results from a non-periodic set of lines which has been superimposed with the same non-periodic set of lines rotated by 3°. The bright and dark linear features visible across the composite pattern in FIG. 9 are not seen in FIG. 10.

It is thought that the geometry disclosed in the second embodiment, in which all prism apexes lie in the same plane, is optimal for recycling light, as when the apexes do not lie in the same plane the light escaping from a prism apex which is above the plane defined by the arithmetic mean prism apex height is less likely to be captured by the adjacent prism; such reduced probability of capture will lead to reduced recycling of light.

Figure 1:
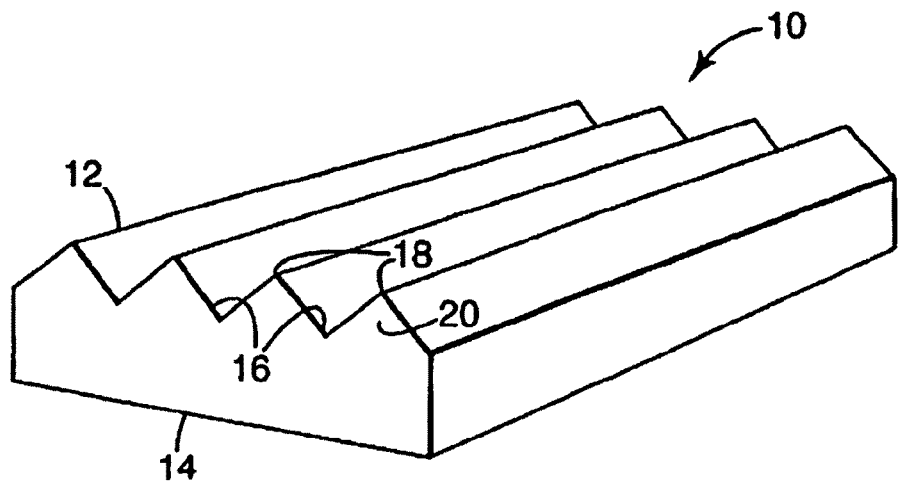
FIG. 1 is a perspective view of a prior art structured optical film.
Figure 2:
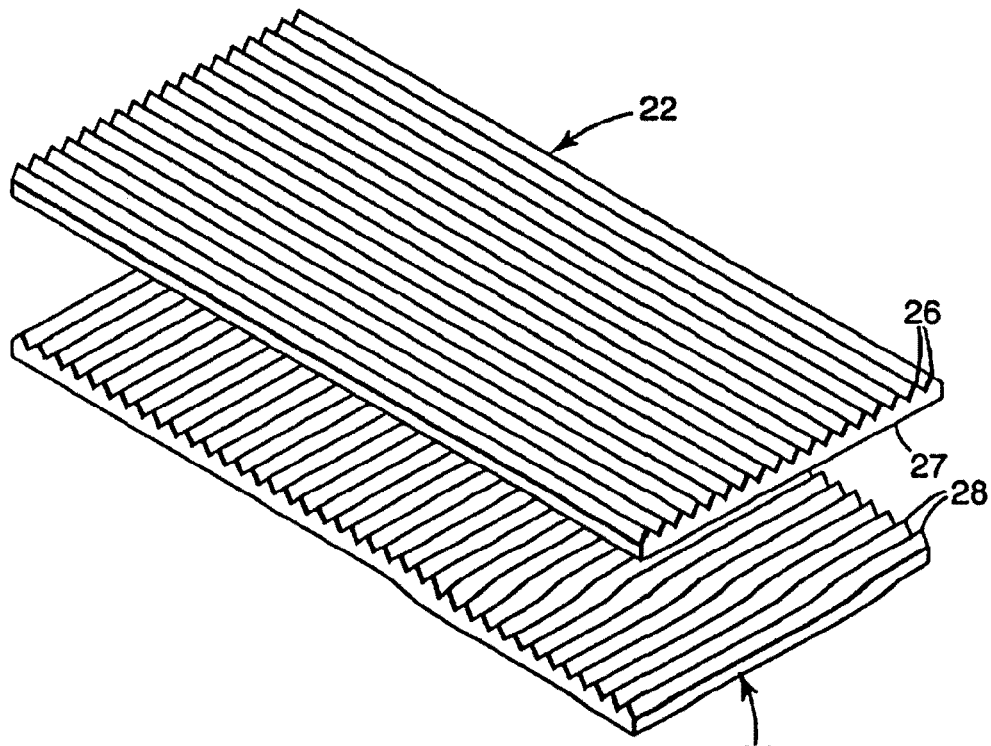
FIG. 2 is a perspective view of an exploded perspective view of a pair of structured films according to the prior art and according to FIG. 1 in which the prisms are crossed at an angle of about 90°.
Figure 3A:
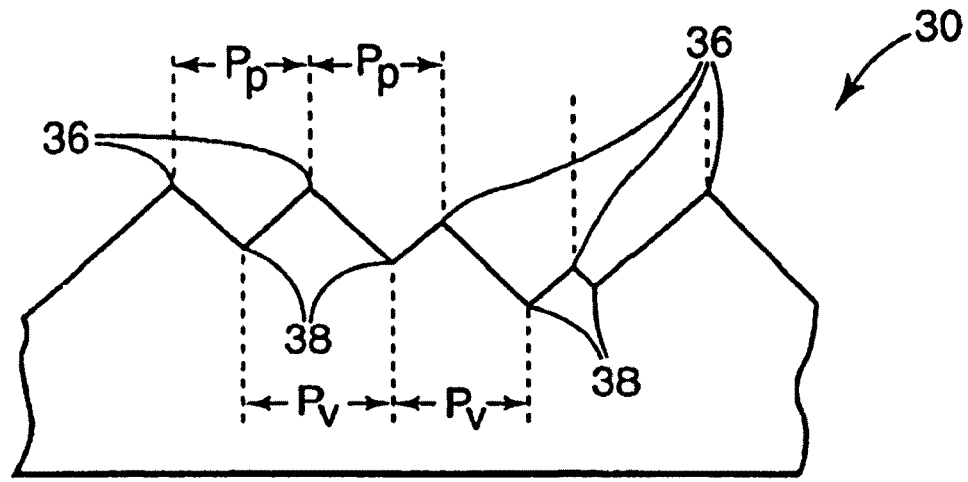
FIG. 3A is a schematic diagram of one section of a structured film according to the prior art with constant peak pitch and a varying valley pitch.
Figure 3B:
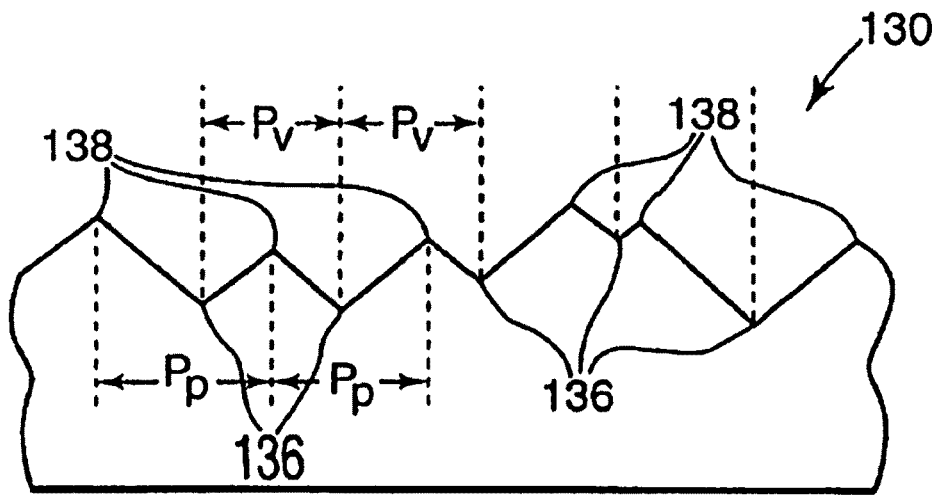
FIG. 3B is a schematic diagram of one section of a structured film according to the prior art with a constant valley pitch and a varying peak pitch.
Figure 4:
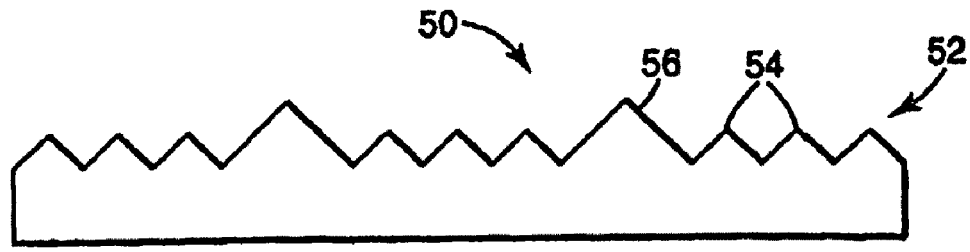
FIG. 4 is a cross-sectional view of a light directing film according to the prior art which has prism elements of varying height.
Figure 5:
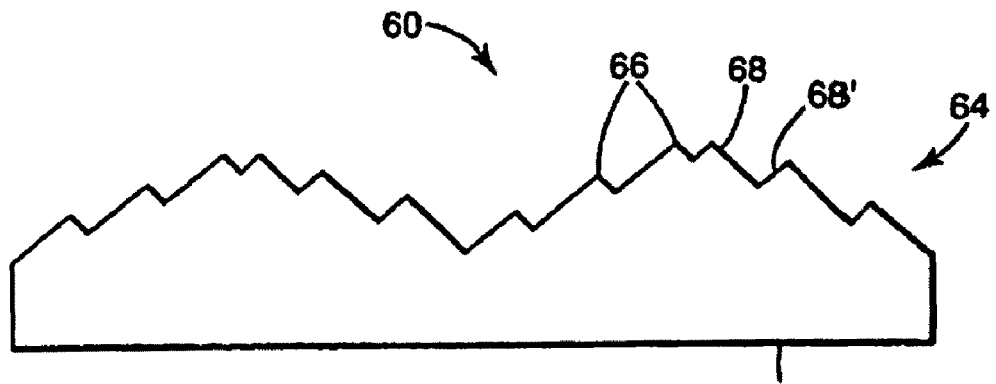
FIG. 5 is a cross-sectional view of a light directing film according to the prior art which has prism elements of varying height.
Figure 6:
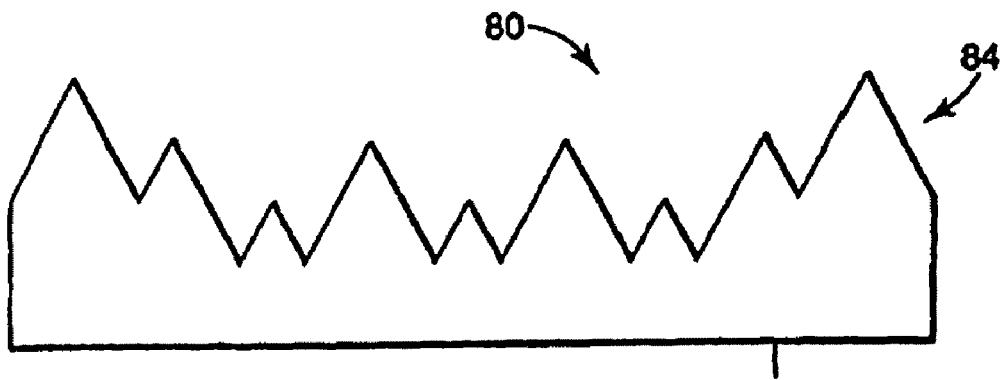
FIG. 6 is a cross-sectional view of a light directing film according to the prior art which has prism elements of varying height.

U.S. Pat. No. 5,919,551 (Cobb) discloses two examples of films comprising prism apexes which do not lie in the same plane. These are reported to lead to a reduction in brightness of approximately 6% to 8% when used in LCD displays in the manner shown in FIG. 2, compared with films comprising prism apexes which do lie in the same plane. The man in the art, therefore, will understand from these results that for a prismatic film there exists to some extent a trade-off between the reduction of the propensity for moiré effects and the brightness enhancement.

The second embodiment of the invention addresses to a significant extent this trade-off problem by providing a film which maintains brightness while simultaneously reducing the propensity for moiré effects.

Figure 11:
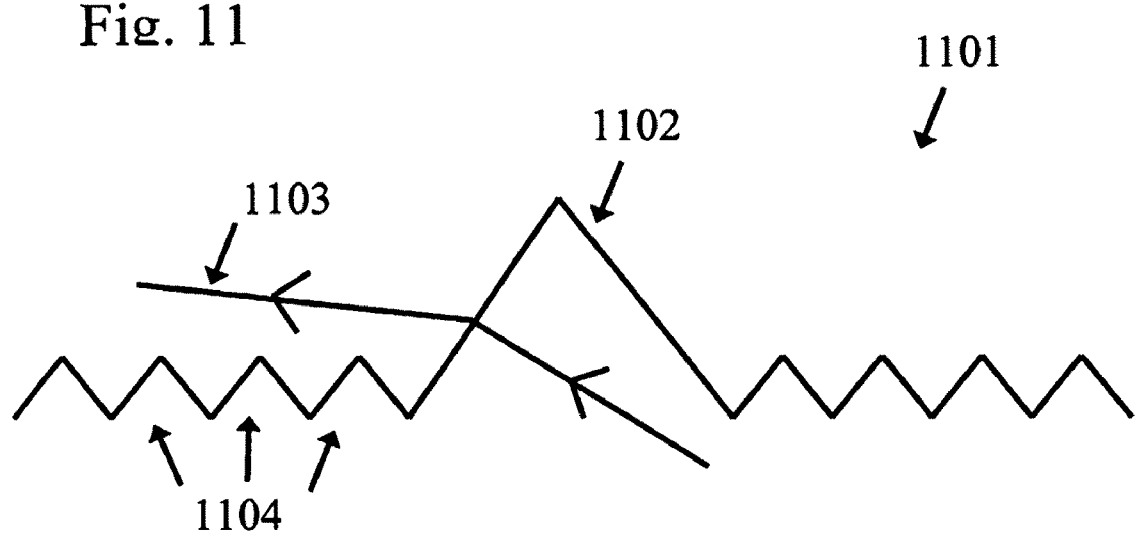
FIG. 11 is a schematic cross-sectional view of a prismatic film with prism elements of substantially differing height.

A particularly extreme case in which a high prism apex leads to non-recycled light is illustrated in FIG. 11. In film 1101 there are larger prisms such as large prism 1102 and smaller prisms such as small prisms 1104. Light ray 1103 exiting the film via large prism 1102 does not enter the small prisms 1104 and hence is not "recycled."

A third embodiment of the invention follows as a special case of the second embodiment, in which the peak apexes all lie in the same plane. It is recalled that U.S. Pat. No. 5,771,328 (Wortman) discusses the undesirable effect of optical coupling caused by contacting or very nearly contacting surfaces of adjacent sheets/films. U.S. Pat. No. 5,771,328 discloses that using prisms with apexes which protrude a distance above the apexes of the remainder of the prisms of at least about 1.0 times the wavelength of light in the vacuum controls the optical coupling between two sheets in such a way as to substantially reduce the presence of the defect comprising uneven light transmission across the surface area of the display. However, the structures disclosed in U.S. Pat. No. 5,771,328 are repeating structures, which tend to enhance moiré effects. The third embodiment of the invention is one in which a fraction of the total number of the prism apexes of the second embodiment protrude a certain distance above the apexes of the remainder of the prisms, the distance being at least about 1.0 times the wavelength of light in the vacuum. This distance is nevertheless small, so that a marked reduction in brightness of the film may be prevented. Any brightness reduction which does result is significantly smaller than the approximately 6% to 8% brightness reduction of the prior art films having largely non-coplanar peaks—films in which the peak heights were varied by up to about a factor of 2. i.e. by up to about 10 μm to 20 μm.

In the third embodiment of the invention, the method of selection of which prism apexes should protrude should not compromise the non-periodicity of the surface structure of the film. For example, when the nth digit of π is a pre-selected number, such as "9", the nth prism apex could be allowed to protrude 2.0 μm higher than when the nth digit of π is not "9". The sequences of lateral distances between adjacent peaks and lateral distances between adjacent valleys should be adjusted accordingly relative to those sequences given for the second embodiment of the invention, the dihedral angles of the peaks and valleys being unchanged. The expected fraction of protruding prisms with respect to all prisms in the film would then be 10%, as there is a 10% probability that a randomly selected digit of π will be "9". There would therefore exist a plane from which the peaks of the film are not displaced up or down by more than about 1.0 μm, this plane being the plane mid-way between the plane containing the lower set of peaks and the plane containing the upper set of peaks. Other methods of constructing such structured optical surfaces will be obvious to those skilled in the art. If the protrusion distance were instead 1.0 μm, there would therefore exist a plane from which the peaks are not displaced up or down by more than about 0.5 μm. In the case of the second embodiment of the invention, there would exist a plane from which the peaks are not displaced by more than about 0.2 μm, or some other limit which is such as manufacturing tolerances permit.

Other schemes which lead to a non-periodic structure which controls the optical coupling between two sheets will be obvious to those skilled in the art. For example, when the nth digit of π is odd, the nth prism apex could be allowed to protrude 2.0 μm higher than when the nth digit of π is not odd. The sequences of lateral distances between adjacent peaks and lateral distances between adjacent valleys should be adjusted accordingly relative to those sequences given for the second embodiment of the invention. The expected fraction of protruding prisms with respect to all prisms in the film would then be 50%, as there is a 50% probability that a randomly selected digit of π will be odd.

An advantage accruing to the specific example given for the second embodiment of the invention over two particular examples, which can be considered to be prior art derived from U.S. Pat. No. 5,771,328 (Wortman) and U.S. Pat. No. 5,183,597 (Lu), will now be described. This advantage is shared to some extent by all embodiments of the invention. The first prior art example considered is a structured film consisting of five symmetric prisms with 90° dihedral angles and base widths of 30 μm followed by five symmetric prisms with 90° dihedral angles and base widths of 50 μm. The grouped structure of ten prisms is repeated indefinitely, with all prism bases being coplanar. The second prior art example is a structure consisting of an array of symmetric prisms with 90° dihedral angles and base widths of 50 μm, repeated indefinitely. Moiré patterns can arise either when there is an insufficiently dense, or when there is an overly intense, distribution of spatial frequencies. A spatial frequency is the reciprocal of the spatial period in a structure, as discussed in "Optics", by Hecht and Zajac, Addison-Wesley, London, UK, 1974. The density of the distribution of spatial frequencies means the number of spatial frequencies present in a given interval of spatial frequency space, for example in the interval between $1/30\,\mu m^{-1}$ and $1/100\,\mu m^{-1}$. The discussion of spatial frequencies given here is conceptual and might not be mathematically rigorous. Spatial frequencies here are those present in a reciprocal space which expresses the spatial frequencies of 90° dihedral angle saw-tooth structures existing in real space; these structures include some structures which embody the invention and further include the two prior art examples above. The reciprocal space used here is therefore not Fourier space, as Fourier space is the reciprocal space in which real space structures are decomposed into sine and cosine functions.

Figure 12A:
FIG. 12 shows schematic spatial frequency distributions over a limited range of spatial frequencies for three films with different structures; the units on the abscissas are $\mu m^{-1}$ i.e. inverse micrometers.
Figure 12B:
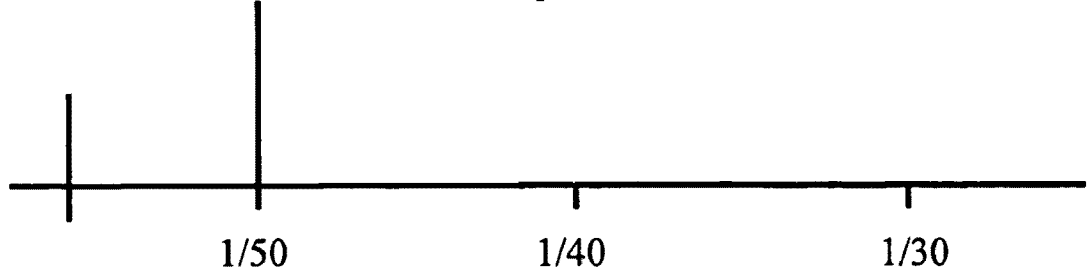

In the second prior art example, there is a fundamental spatial frequency of $1/50\,\mu m^{-1}$, as shown in FIG. 12B, and there are harmonics at $1/(50k)\,\mu m^{-1}$, where k is a whole number greater than 1. In the first prior art example given, the fundamental spatial frequency distribution of prism apex and prism valley lateral separations has two components of equal intensity at $1/30\,\mu m^{-1}$ and $1/50\,\mu m^{-1}$, with a weaker component at $1/40\,\mu m^{-1}$ which corresponds to the lateral separation of prism apexes between a 30 μm base width prism and an adjoining 50 μm base width prism. This distribution is shown in FIG. 12A. Further spatial frequencies can be derived from the next-nearest neighbour prism apex and valley lateral separations in the structure, from the next-next-nearest neighbour prism apex and valley lateral separations in the structure, and so on. Since the next-nearest neighbour peak or valley separations in the first prior art example can be 60 μm, 70 μm, 80 μm, 90 μm or 100 μm, the corresponding spatial frequencies are $1/60\,\mu m^{-1}$, $1/70\,\mu m^{-1}$, $1/80\,\mu m^{-1}$, $1/90\,\mu m^{-1}$ and $1/100\,\mu m^{-1}$, respectively. The improvement, i.e. the greater density of spatial frequencies over the second prior art example consisting solely of 50 μm wide prisms, is evident: next-nearest neighbour distances in the latter are 100 μm only, which corresponds to a spatial frequency of $1/100\,\mu m^{-1}$.

Figure 12C:
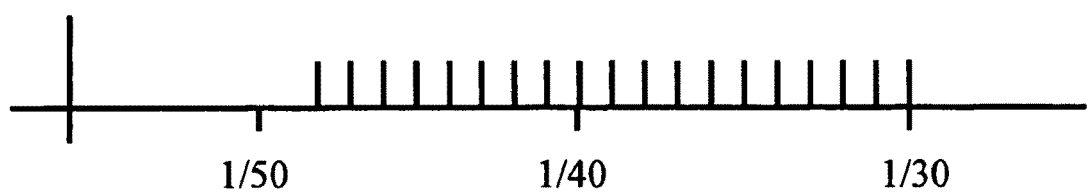

But considering the distribution of spatial frequencies from the specific example given of the second embodiment of the invention, there are ten fundamental spatial frequencies derived from the lateral apex separations of the form $1/(30+2k)\,\mu m^{-1}$, where k is a whole number from zero to 9. There are 19 fundamental spatial frequencies derived from the lateral valley separations of the form $1/(30+k)\,\mu m^{-1}$, where k is a whole number from zero to 18. This distribution is derived solely from the nearest neighbour distances in the structure, and is evidently significantly more dense than those distributions derived from the two prior art repeating pattern structures considered by way of comparison. The spatial frequency distribution derived from the specific example of the second embodiment of the invention is illustrated in FIG. 12C, which can be compared with FIGS. 12A and 12B. For the next-nearest neighbour distances, the set of spatial frequencies for the lateral peak and valley separations has 37 elements and is given by $1/(60+k)\,\mu m^{-1}$, where k is a whole number from zero to 36. The advantage of the non-periodic structure in generating a denser distribution of spatial frequencies is accentuated upon consideration of next-nearest neighbour distances and next-next nearest neighbour distances, and so on. A further advantage is that the maximum intensity of the spatial frequencies decreases more rapidly in the case of the non-periodic structure described here than in the case of the repeating pattern structures described here in the mathematical limit that one tends towards zero inverse micrometers. The ability of the non-periodic structures to reduce the scope for moiré interference patterns over prior art repeating pattern structures is thereby demonstrated.

It will be appreciated by those skilled in the art that a further advantage of the non-periodic structures disclosed here is that, through their reduced propensity for moiré interference pattern problems, one may be able to use weaker diffuser sheets in displays than those commonly employed to mask such problems, thereby enhancing the brightness of a given display, as weaker diffuser sheets typically transmit a greater fraction of light incident upon them than do stronger diffuser sheets.

Preferably, a ratio of the largest to the smallest lateral distance between adjacent peaks is about 1.2 or greater. Similarly, a ratio of the largest to the smallest lateral distance between adjacent valleys is preferably about 1.2 or greater. Alternatively, the ratio of the largest to the smallest lateral distance between adjacent peaks or adjacent valleys respectively may be about 1.5 or greater. Alternatively still, the ratio of the largest to the smallest lateral distance between adjacent peaks or adjacent valleys respectively may be about 2.0 or greater.

The average distance between peaks in a film manufactured according to the present invention will preferably be about 1 millimeter or less, more preferably this average distance will be about 100 micrometers or less when the structured film is used in optical displays incorporating liquid crystal display panels and similar devices. More preferably, this average distance for those applications will lie within about 20 to about 60 micrometers.

It will be understood by the skilled person that any possible and desirable combination(s) of teachings from the above or following description forms part of the invention and are intended to fall within the scope of the claims. For example, a structured optical film may have peaks which vary in height with respect to a reference plane defined by the film both laterally across the film, but also longitudinally across the film, with one, or both, of the sequences of lateral distances between adjacent peaks or valleys being non-periodic. Alternatively, or additionally, the heights of the valleys with respect to the reference plane may vary in a similar manner.

An optical film can be produced using a tool manufactured by any known method. If the tool used to produce the film is a roll, it can be manufactured by thread cutting at a constant or a variable thread spacing, plunge cutting using a constant or variable spacing between grooves, or any other useful method. In the second embodiment of the invention, it is preferred to form each groove in the tool to the same depth when forming the tool used to manufacture the film.

If the tool used to form the film is a cylindrical roll formed using plunge cutting, it is possible to constantly vary the depth of the groove formed in the roll by a cutting tool. That variation could include varying the depth of the groove at a constant or changing rate between a minimum and maximum, although it may also be helpful to have interim targeted depths between the minimums and maximums that are interspersed about the circumference of the roll, to avoid adding a repeating pattern into the grooves and, thus, the film. In the second embodiment of the invention, it is preferred to form each groove in the tool to the same depth when forming the tool used to manufacture the film.

When thread cutting, it may also be desirable to vary the number of revolutions, or "wraps," over which the cutting tool is moved between different targeted groove depths and/or different targeted groove spacings and, also, to use a number of roll revolutions between targeted depths and/or targeted spacings that is not an integer. Even more preferably, it is desirable to use a number of revolutions including a fractional portion that cannot be multiplied easily by an integer to equal some other integer. Examples of useful numbers of, revolutions over which groove depth would be varied include, for example, approximations obtained using a suitable number of significant figures of the expressions $1+1/\pi$, $1+\pi/20$, $1-1/\pi$, or $\sqrt{\pi}$. The targeted depth of the groove would then vary between the starting and ending point of each desired number of revolutions of the roll.

After the tool is manufactured, the film can be manufactured using the tool according to any suitable method. Examples of methods and materials for forming structured optical films are discussed in U.S. Pat. No. 5,175,030 (Lu et al.) and U.S. Pat. No. 5,183,597 (Lu). It will be understood that the chosen manufacturing process is at least somewhat dependent on the material used for the films.

An optical film can be produced using a tool manufactured by any known method. It will be understood that the height of the peaks in the finished film is a function of the depth of the grooves cut into the tool. If the tool used to produce the film is a cylindrical roll, the tool can be manufactured by thread cutting the roll with a variable spacing between the grooves used to form the peaks in order to produce a varying lateral peak spacing in the film. The number of revolutions of the tool for a sufficiently high speed of advance of the cutting element along the tool will define the number of distinct grooves formed.

In the second embodiment of the invention, because the peak apexes all lie in the same plane, the depth of the grooves cut into the tool would all be equal; for thread cutting, the varying distance between the grooves on the tool would be accomplished by varying the speed of advance of the cutting element along the tool as the tool is rotated azimuthally at a constant angular velocity during cutting. In other embodiments of the invention, in which the peak apexes are coplanar to within some predefined vertical distance range and the valley bottoms are not necessarily coplanar, for thread cutting, the required profile cut into the tool can be accomplished by varying the depth of the cut into the tool by the required amount and by varying the speed of advance of the cutting element along the tool in concert as the tool is cut.

The tooling used to manufacture the specific example of the film of the second embodiment can, however, be replicated by electroforming or other suitable processes, thus forming a "negative" of the pattern formed on the master tool. When that replicated tool is then used to form a film, the result is a film that is a "negative" of the film formed from the original tool. As a result, a film formed from the replicated tool has a constant valley depth, while the peak heights vary across the film. That is exactly the opposite of the characteristics of the specific example of the film of the second embodiment of the invention. It will be appreciated by those skilled in the art that a tool formed to manufacture a film which is an embodiment of the invention can be replicated by electroforming or other suitable processes, thus forming a "negative" of the pattern formed on the master tool. The replicated tool can then be used to manufacture the film which is the "negative" of the film formed from the original tool.

By analogy with respect to FIG. 2, two non-periodic structured optical films manufactured according to the present invention can be combined in a crossed relationship to reduce the visibility of moiré interference patterns. As an alternative, it may be helpful to use a structured film according to the present invention for the upper layer of such a paired construction, because it is the upper layer that is the most significant contributor to the visibility of moiré interference patterns. Where films according to the present invention are used for the upper film, the lower film could be any other suitable structured optical film useful for enhancing brightness of optical displays. Examples of suitable films for pairing with the structured optical film manufactured according to the present invention are available from Minnesota Mining and Manufacturing Company, St. Paul, Minn., (marketed under the trade name Brightness Enhancement Film).

Figure 13:
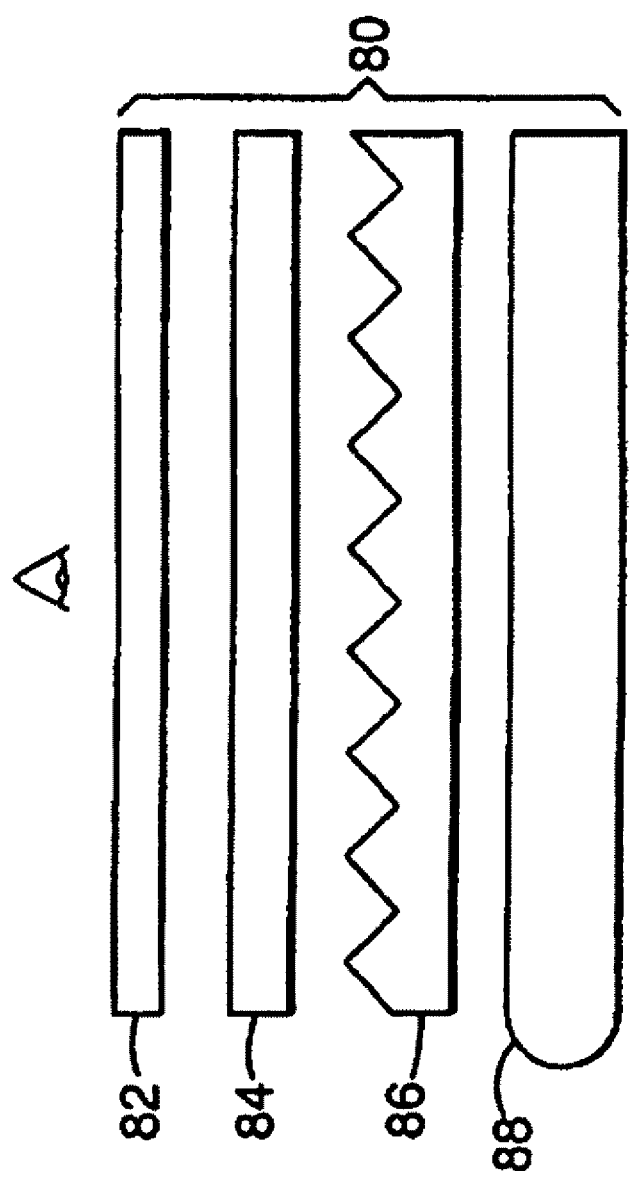
FIG. 13 is a schematic diagram of an optical display assembly incorporating at least one layer of structured optical film according to the present invention.

FIG. 13 illustrates one application in which one or more layers of structured optical film manufactured according to the present invention can be advantageously used. The application is a backlit optical display assembly 80. The assembly 80 includes a display panel 82 and two crossed layers of structured optical films 84 and 86 manufactured according to the present invention. Film 84 is the "upper film" of the two structured films. The optical display assembly 80 includes a backlight assembly 88 for use in illuminating the display panel 82. The assembly 80 may include one or more further optical films (not shown) known from the prior art, such as the reflective polarizer film described in U.S. Pat. No. 5,828,488 and in U.S. Pat. No. 6,025,897. Although two structured optical films are depicted in FIG. 13, it will be understood that an optical display could include only a single structured optical film manufactured according to the present invention; alternatively, one of the films 84 and 86 could be a film known from the prior art. Further films known from the prior art could also be included in the assembly (not shown).

While embodiments according to the present invention have shown the structured optical film with one surface being structured, the film could additionally be provided with a further structured surface, so that the film has at least one structured surface.

Although peak and valley dihedral angles of 90° have been emphasized in the embodiments of the invention described in the Figures herein, it will be appreciated that embodiments of the invention include films with dihedral peak and valley angles that are equal to some angle other than 90°. For example, a dihedral peak and valley angle that is equal to an angle in the range between 59° and 79° is known to be useful in light redirecting applications, as it may be used to turn a light beam through an angle in the range of 65° to 85°. In such an application in an optical display assembly the film embodying the invention may be placed between a light source and a display panel. In such an application, the film may be useful in reducing moiré effects or other optical artefacts resulting from optical coupling, as herein described.

Although the particular material used to manufacture structured optical films according to the present invention may vary, it is important that the material be substantially transparent to ensure high optical transmission. Useful polymeric materials for this purpose are commercially available such as, for example, acrylics, and polycarbonates having nominal indices of refraction of about 1.493 and 1.586, respectively. Other useful polymers include acrylate, polyester, polypropylene, polyurethane, polystyrene, polyvinyl chloride, and the like. While the particular material is not critical, materials having higher indices of refraction will generally be preferred. Useful materials for forming structured optical films are discussed in U.S. Pat. No. 5,175,030 (Lu et al.) and U.S. Pat. No. 5,183,597 (Lu).

Also, although methods of producing tooling useful for manufacturing structured optical films according to the present invention are described above, it will be understood that any method of producing tooling and/or manufacturing a structured optical film with a non-periodic sequence of peak lateral separations and a non-periodic sequence of valley lateral separations could be substituted.

In addition, although the focus of the above discussion has been on the use of cylindrical tools for manufacturing structured optical films according to the present invention, it should be understood that planar tooling could also be used to manufacture the films. Furthermore, although thread cutting of cylindrical rolls will not produce a film having exactly parallel prisms, the prisms will be generally parallel for the purposes of the present invention.

Various modifications and alterations of this invention will become apparent to those skilled in the art without departing from the scope of this invention, and it should be understood that this invention is not to be unduly limited to the illustrative embodiments set forth herein.

The invention claimed is:

1. A structured optical film having a structured surface extending longitudinally between a first end and a second end and laterally between a first side face and a second side face, the structured surface comprising a plurality of substantially parallel and elongate light-directing elements, each element having a respective peak and defining at a junction with an adjacent element a respective valley, each of the peaks and valleys defining substantially the same dihedral angle and extending substantially uninterrupted across the structured surface between the first and second ends, wherein a first sequence defined by successive lateral distances between adjacent peaks from the first side face to the second side face is a first non-periodic sequence and a second sequence defined by successive lateral distances between adjacent valleys from the first side face to the second side face is a second non-periodic sequence, the second sequence being configured based on the first sequence, such that the peaks are arranged in a substantially coplanar formation and the valleys are arranged in a substantially non-coplanar formation.

2. The film of claim 1, wherein the peaks are substantially coplanar in that there exists a plane from which each respective peak is distant by no more than about 1.0 μm.

3. The film of claim 1, wherein the peaks are substantially coplanar in that there exists a plane from which each respective peak is distant by no more than about 0.5 μm.

4. The film of claim 1, wherein the peaks are substantially coplanar in that there exists a plane from which each respective peak is distant by no more than about 0.2 μm.

5. The film of claim 1, wherein the lateral distance between each pair of adjacent valleys having a first peak adjacent one side of the pair and a second peak adjacent the other side of the pair is half the lateral distance between the first and second peaks.

6. The film of claim 1, wherein a ratio of the largest to the smallest lateral distance between adjacent peaks or adjacent valleys respectively is about 1.2 or greater.

7. The film of claim 1, wherein a ratio of the largest to the smallest lateral distance between adjacent peaks or adjacent valleys respectively is about 1.5 or greater.

8. The film of claim 1, wherein a ratio of the largest to the smallest lateral distance between adjacent peaks or adjacent valleys respectively is about 2.0 or greater.

9. An optical display assembly comprising:
a display panel;
a backlight assembly; and
a structured optical film according to claim 1, the film being located between the backlight assembly and the display panel.

10. The optical display assembly of claim 9, further comprising a second structured optical film, the second structured optical film being located between the backlight assembly and the first structured optical film and the second structured optical film having a structured optical surface comprising a plurality of elongate prisms, where the films are oriented such that the elongate elements of the second film are substantially crossed with respect to the elongate elements of the first film.

11. An optical display assembly comprising:
a display panel;
a light source; and
a structured optical film according to claim 1, the film being located between the light source and the display panel.

12. The film of claim 1, wherein the first non-periodic sequence is generated based on consecutive decimal digits of pi.

13. The film of claim 1, wherein each value in the second non-periodic sequence equals half the sum of an adjacent pair of peak distances.

14. A structured optical film having a structured surface extending longitudinally between a first end and a second end and laterally between a first side face and a second side face, the structured surface comprising a plurality of substantially parallel and elongate light-directing elements, each element having a respective peak and defining at a junction with an adjacent element a respective valley, each of the peaks and valleys defining substantially the same dihedral angle and extending substantially uninterrupted across the structured surface between the first and second ends, wherein a first sequence defined by successive lateral distances between adjacent peaks from the first side face to the second side face is a first non-periodic sequence and a second sequence defined by successive lateral distances between adjacent valleys from the first side face to the second side face is a second non-periodic sequence, the first sequence being configured based on the second sequence, such that the valleys are arranged in a substantially coplanar formation and the peaks are arranged in a substantially non-coplanar formation.

15. The film of claim 14, wherein the valleys are substantially coplanar in that there exists a plane from which each respective valley is distant by no more than about 1.0 µm.

16. The film of claim 14, wherein the valleys are substantially coplanar in that there exists a plane from which each respective valley is distant by no more than about 0.5 µm.

17. The film of claim 14, wherein the valleys are substantially coplanar in that there exists a plane from which each respective valley is distant by no more than about 0.2 µm.

18. The film of claim 14, wherein the lateral distance between each pair of adjacent peaks having a first valley adjacent one side of the pair and a second valley adjacent the other side of the pair is half the lateral distance between the first and second valleys.

19. The film of any claim 14, wherein a ratio of the largest to the smallest lateral distance between adjacent peaks or adjacent valleys respectively is about 1.2 or greater.

20. The film of claim 14, wherein a ratio of the largest to the smallest lateral distance between adjacent peaks or adjacent valleys respectively is about 1.5 or greater.

21. The film of claim 14, wherein a ratio of the largest to the smallest lateral distance between adjacent peaks or adjacent valleys respectively is about 2.0 or greater.

22. An optical display assembly comprising:
    a display panel;
    a backlight assembly; and
    a structured optical film according to any of the preceding claims 14, the film being located between the backlight assembly and the display panel.

23. The optical display assembly of claim 22, further comprising a second structured optical film, the second structured optical film being located between the backlight assembly and the first structured optical film and the second structured optical film having a structured optical surface comprising a plurality of elongate prisms, where the films are oriented such that the elongate elements of the second film are substantially crossed with respect to the elongate elements of the first film.

24. An optical display assembly comprising:
    a display panel;
    a light source; and
    a structured optical film according to claim 14, the film being located between the light source and the display panel.

25. The film of claim 14, wherein the second non-periodic sequence is generated based on consecutive decimal digits of pi.

26. The film of claim 14, wherein each value in the first non-periodic sequence equals half the sum of an adjacent pair of valley distances.

* * * * *